June 20, 1967 J. E. GERLI 3,326,192
COOLING SYSTEM FOR INTERNAL COMBUSTION ENGINES
Filed May 18, 1965
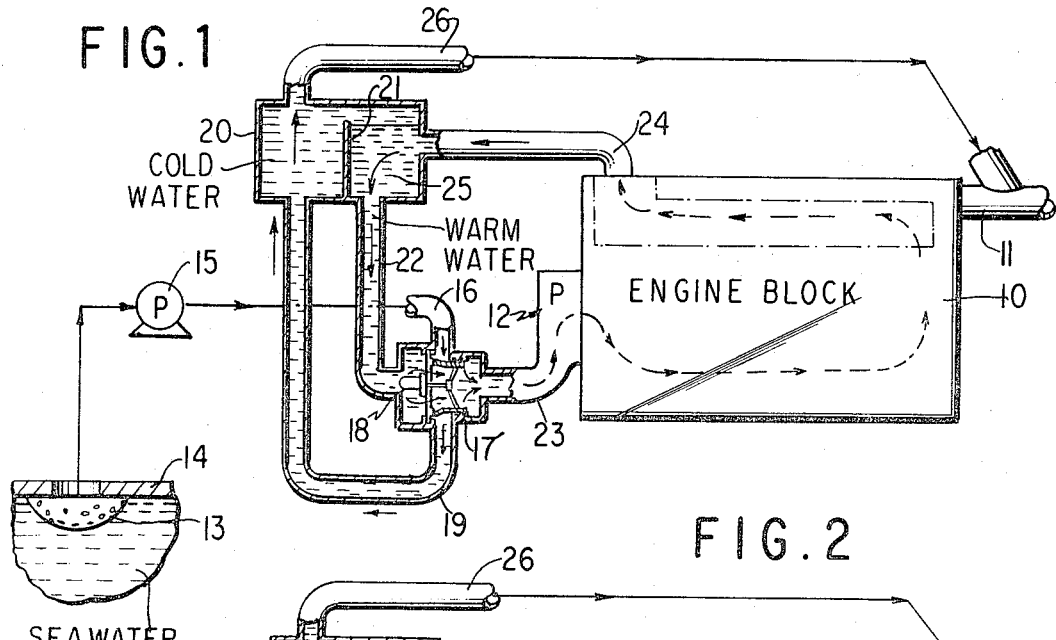
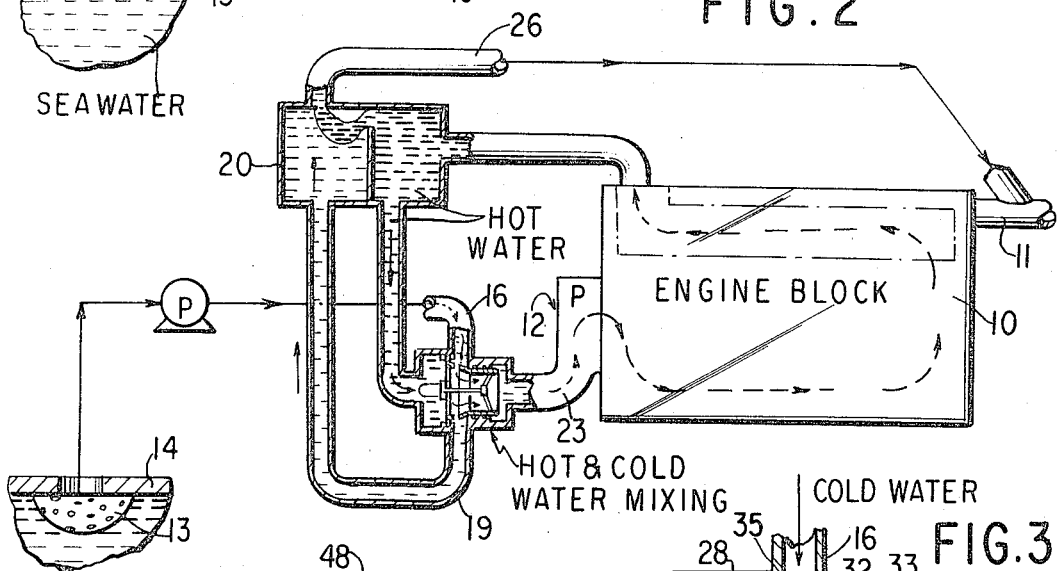
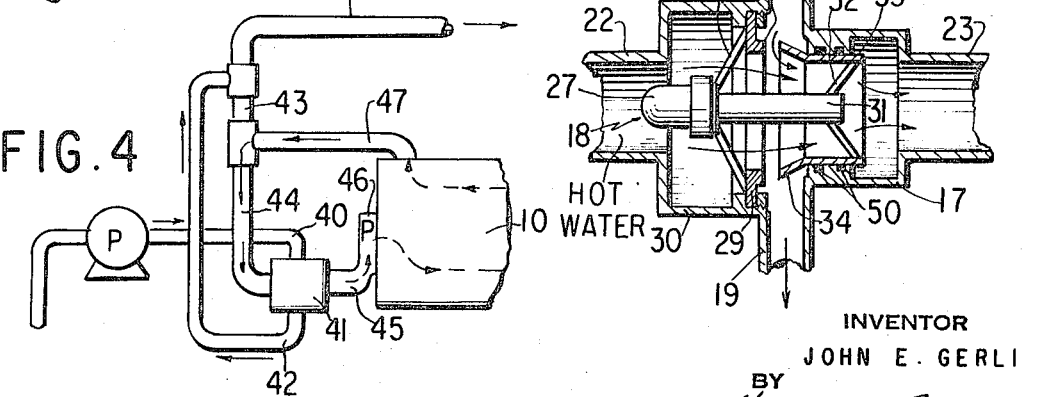
INVENTOR
JOHN E. GERLI
BY
Harvey W. Edelblute
ATTORNEY United States Patent Office 3,326,192
Patented June 20, 1967

3,326,192
COOLING SYSTEM FOR INTERNAL
COMBUSTION ENGINES
John E. Gerli, Taconic Road, Greenwich, Conn. 06830
Filed May 18, 1965, Ser. No. 456,737
3 Claims. (Cl. 123—41.09)

ABSTRACT OF THE DISCLOSURE

A cooling system for water jacketed internal combustion engines characterized by having two circulation systems interconnected by a mixing chamber, one system circulating cooling water through the water jacket and the other supplying cold make-up water to the first circulating system through a thermostatically actuated mixing valve located in the mixing chamber as required to maintain uniform temperature of the cooling water.

This invention relates to a cooling system for marine engines.

Internal combustion marine engines are usually cooled with sea water which is drawn through an opening in the hull below the water line, then circulated through the engine block, through a jacket on the exhaust manifold and finally into the exhaust line and overboard. To obtain a more uniform and higher temperature of the circulating cooling water, more refined cooling systems recirculate part of the cooling water blended with amounts of fresh cold water from the sea as may be needed to maintain the system at optimum temperatures.

Many schemes have been devised for controlling the temperature of the recirculating water, but they have been characterized by a complexity of design which involve thermostats, pressure relief valves, and other mechanical elements which are expensive and apt to get out of order. The novel cooling system of the present invention is characterized by using the regular water circulating pump mounted on the engine block and having only one thermostatically controlled mixing valve to maintain the water circulating in the engine block at a constant temperature without permitting cold raw sea water to suddenly enter the circulating system and produce rapid temperature changes in the engine.

In order that the nature of the present invention will be more clearly understood, reference is made to the accompanying drawing in which:

FIGURE 1 is a diagrammatic view in elevation and partly in section of the cooling system of the present invention;

FIGURE 2 is similar to FIGURE 1 differing only in that it shows an operating condition in which cold water is being mixed with the circulating hot water;

FIGURE 3 is a sectional elevation of the thermostatically controlled mixing valve in open position; and FIGURE 4 is a diagrammatic view in elevation of the circulatory system of the present invention made from conventional pipe fittings.

Referring again to FIGURE 1, the drawing shows diagrammatically an internal combustion engine block 10 with exhaust line 11 and the usual water circulating pump 12. Most inboard marine engines of the smaller sizes are adaptations of automobile or tractor internal combustion engines, and it is one of the advantages of the cooling system of the present invention that little or no change need be made in the conventional engine block or the water circulating pump which is usually a part thereof.

As in ordinary practice, sea water is drawn through a strainer 13 covering a hole in the hull 14 of the boat by a pump 15. In the cooling system of the present invention, the cold water is pumped through a pipe 16 into a mixing chamber 17 in which is located a thermostatically operated circulation control valve 18. The construction of this mixing valve is shown in larger detail in FIGURE 3, and its operation will be described below.

When the motor is started and the engine is cold, pump 15 forces water through line 16 into a closed off section of the mixing chamber into line 19 and then into chamber 20 which, as shown in FIGURE 1, has a partitioning member 21 extending upwardly from the bottom of the chamber. As will be apparent upon examination of FIGURE 1, the cold sea water will at first overflow the dividing member 21 and enter the circulating line 22, pass through the mixing valve 18, which is then in a closed position, into line 23 through pump 12 and into the engine block 10. The circulating water then passes through the water cooling jacket of the exhaust manifold (not shown) into line 24 and back into section 25 of the chamber 20.

When this part of the circulatory system has been completely filled as just described raw sea water will no longer circuate through the engine block but, rather, will flow through line 19 into chamber 20 and will then pass through line 26 into the exhaust pipe 11. However, water pump 12 will continue to circulate water through the engine block without cold sea water being mixed therewith except as needed.

In order for the circulatory system to operate as just described, it is necessary that chamber 20 be at an elevation higher than the outlet from the engine block and below the spill line 26. When this is the case, the circulation system will fill with water and be recirculated before any water is spilled overboard. As will also be noted, the circulation system, including the water jacket of the engine, will remain filled with water when the engine is stopped. Of course, conventional drain cocks, not shown, will be placed at necessary locations to drain the water from the system when desired.

Control of the temperature of the circulating water is achieved by mixing required amounts of the cold raw sea water with the hot water circulating through the engine block. A thermostatically controlled mixing valve which is illustrated in more detail in FIGURE 3 is used for this purpose. Although a number of suitable valves of this type are commercially available, the control valve to be described is one sold by the American Standard Controls Division of American Radiator and Standard Sanitary Corporation, Detroit, Mich., under the name Vernatherm Valve. This valve has a sensor unit 27 which is supported by a spider 28 leading to a frame 29 which is fastened in any suitable manner to the inner wall 30 of the mixing chamber 17. Rod 31 is actuated laterally by the sensor unit in response to temperature changes in the water flowing past the sensor unit. Preferably, the sensor element is in the hot side of the circulating water, as shown. Movement of the rod is restricted by springs which are not shown in the drawing. A second spider 32 mounted on the rod supports a tubular member 33. The tubular member is free to move laterally as the position of rod 31 changes in response to the sensor unit but is sealed with water-tight packing 50 to prevent water passing into line 23 from the outer periphery of the tubular element 33. This latter member has a flanged end 34 which seats against a suitably machined valve seat 35 of frame 29 when the circulating water is cold—the condition shown in FIGURE 1. In other words, when the circulating water is cold, the mixing valve is closed and cold sea water from line 16 cannot enter the circulating cooling water flowing in line 23. The tubular element is, in effect, a continuation of lines 22 and 23 when the circulating water is cold and there is no opening between the valve surfaces 35 and 34 as shown in FIGURE 1.

Under cold conditions, the raw circulating sea water cannot mix with the warm water circulating through the mixing chamber 17 as just explained. However, as the circulating water from the engine block becomes warm, the sensor element will react to force tubular element 33 away from its seated position and thus provide an opening between valve seats 34 and 35 into which cold circulating water coming through line 16 will enter and mix with the warm water flowing through tubular element 33. The amount of cold water being mixed with the circulating warm water will, of course, vary with the extent of the opening which in turn will vary with the temperature of the circulating water. As will be seen, cold water is added only as needed to maintain a predetermined temperature of the water circulating through the engine block. There will, therefore, be no sudden change of temperature in the circulating water.

As noted above, the circulating system can be made of standard pipe fittings and such an installation is illustrated in FIGURE 4. In this embodiment of the invention cold water from the sea will pass through line 40, through mixing chamber 41, which is constructed in the same manner as shown in FIGURE 3, through line 42, and into lines 43 and 44, through the closed thermostatically controlled mixing valve 18 as in FIGURE 3, through spider 28, through the tubular element 33, into line 45 through pump 46, into the engine block 10, and out through line 47. When lines 44, 45, and 47 and the engine block have been filled, the sea water constantly being pumped from the sea will then flow out through line 48 where it can be discharged overboard or into the exhaust line as described above. Pump 46 will continue to circulate water through this system, and as it becomes heated, sensor element 27 of the thermostatic controlled mixing valve will open a gap between the valve seat elements 34 and 35 as shown in FIGURE 3, and cold sea water will mix with the circulating hot water as previously described. As in the case of the particular construction previously described, the spill line 48 is at a higher elevation than the line 47 from the engine and is also higher than the sea water circulating line 42 so that the circulating system is completely filled before water is spilled overboard.

What is claimed is:

1. A cooling system for internal combustion engines having a water jacket which comprises a water mixing chamber, means to force water from said mixing chamber through said water jacket into an overflow chamber having a partitioning member extending upwardly from the bottom of the chamber to a point above that at which the line carrying hot water from the water jacket enters said overflow chamber, means permitting hot water to flow from said overflow chamber back to said mixing chamber, means to force cold water from an external source into said mixing chamber and thence to a cold water section of said overflow chamber separated from the hot water section thereof by said partitioning member, a spill line at an elevation higher than the top of said partitioning member permitting excess water to leave the system, a thermostatically actuated valve in said mixing chamber, the said valve in said mixing chamber being adapted to permit circulating hot water to pass from the water jacket of the engine through it without impediment and back into the water jacket at all times, said valve having an element responsive to temperature changes whereby when the temperature of the circulating water exceeds a predetermined level the valve will open and permit cold water from said external source to mix with the stream of water circulating through said mixing chamber and thereby maintain the temperature of the circulating water at a predetermined level.

2. A cooling system in accordance with claim 1 in which the mixing valve has a heat sensitive element on the hot side of the flow of water through the valve controlling the cold water entry port.

3. A cooling system for water jacketed internal combustion engines characterized by having two circulating systems interconnected by a mixing chamber having three sections, one of said circulation systems comprising means to circulate water continuously from the second section of said mixing chamber through the water jacket of the engine to an overflow chamber and thence into the first section of said mixing chamber, a thermostatically controlled mixing valve between the first and second sections of said mixing chamber, the second circulation system comprising means to continuously circulate cooling water through the third section of said mixing chamber between the first and second sections thereof and around said thermostatically controlled mixing valve and thence into said overflow chamber, a spill line from said overflow chamber at an elevation higher than the first named circulation system, the said thermostatically controlled mixing valve having a sensor element extending into said first section of the mixing chamber and having means responsive thereto to open a port in said valve in the third intermediate section of the mixing chamber to permit cold water from the second circulation system to mix with the hot circulating water in the first circulating system as required to maintain a predetermined temperature of the water circulating through the water jacket.

References Cited

UNITED STATES PATENTS

| 2,478,489 | 8/1949 | Kelson | 123—41.08 |
| 3,163,157 | 12/1964 | Connell | 123—41.09 |
| 3,255,740 | 6/1966 | Walsh | 123—41.09 |

FOREIGN PATENTS

| 1,090,730 | 10/1954 | France. |
| 381,232 | 9/1923 | Germany. |

MARK NEWMAN, *Primary Examiner.*

AL LAWRENCE SMITH, *Examiner.*